Dec. 17, 1957 R. C. BOUGHTON 2,816,472
GASKET-CARRYING COUPLING NUT
Filed July 13, 1953
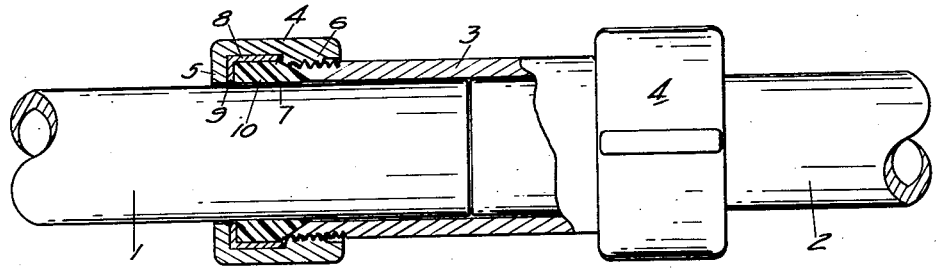
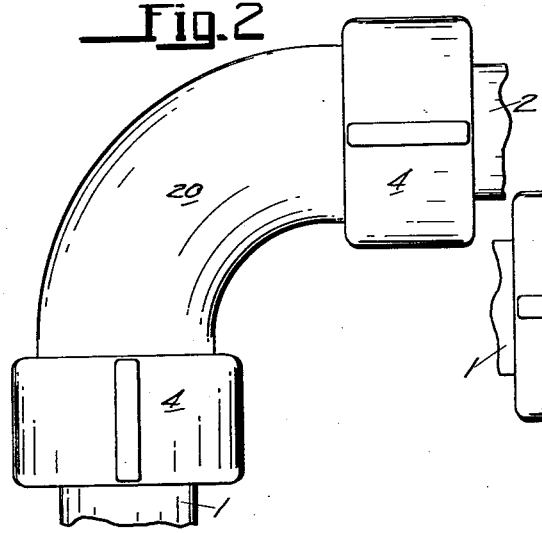
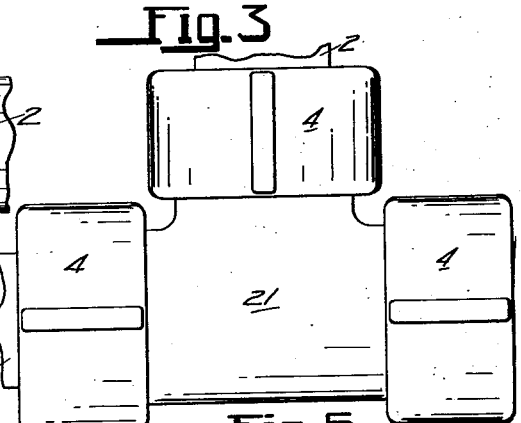
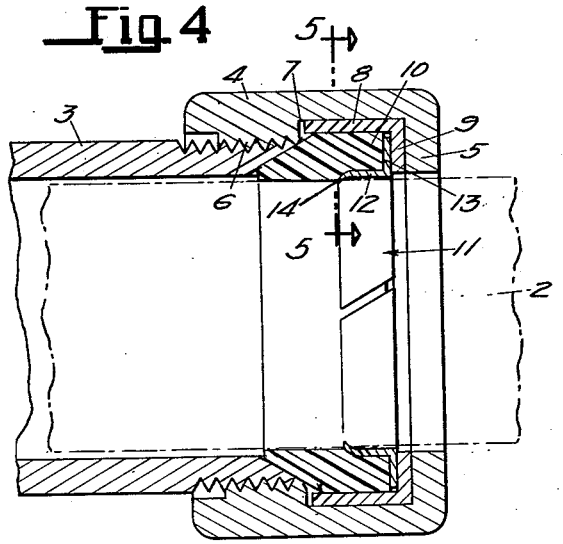
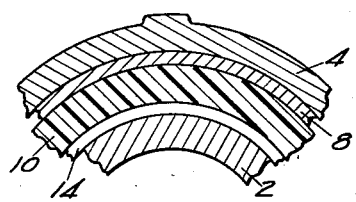
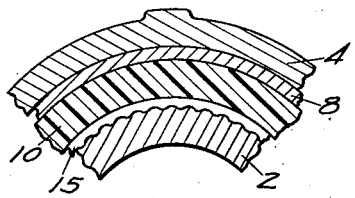
INVENTOR.
ROGER C. BOUGHTON
BY
*Boyken, Mohler & Beckley*
ATTORNEYS

United States Patent Office 2,816,472
Patented Dec. 17, 1957

2,816,472

GASKET-CARRYING COUPLING NUT

Roger C. Boughton, Alhambra, Calif.

Application July 13, 1953, Serial No. 367,419

1 Claim. (Cl. 85—32.1)

This invention relates to a compression pipe coupling of the type employed for coupling the threaded or unthreaded ends of pipe together and which coupling may be in the form of a regular coupling for axially aligned pipe lengths, or L's of different degrees or T's in which at least one of the lengths coupled together is not in alignment with the other or others.

One of the objects of the invention is the provision of a coupling of the above type described above that is more economical to make than heretofore and another object is the provision of a coupling of said type in which sealing gaskets are so arranged as to be held with the clamping nuts that are employed in the coupling so as not to become lost or misplaced when the nut is removed, and in which nut provision is made to insure against injury to the gasket during a clamping operation.

In explanation of the above, compression pipe couplings normally employ a sleeve, L or T having a bore opening outwardly of the ends of the sleeve or the arms of the L or T and into which bore (at said open ends) the pipe lengths extend. A nut is threaded onto the outer ends of the sleeve or at the ends of each arm and each nut has a radially inwardly directed flange spaced outwardly of the sleeve or each arm so as to compress a gasket positioned between each flange and the end of the sleeve or the end of the arm for forcing such gasket radially inwardly into sealing relation with the outer sides of the pipe. It has been customary to position a metal band around each gasket to provide a bearing surface for the nut so that the latter will not mutilate the gasket as it rotates in a tightening operation, and such band may have a flange extending alongside the gasket to slidably engage the nut.

By heretofore conventional structure, when each nut is removed, the gasket and metal band readily fall therefrom with the result that they may be lost, or valuable time is lost in hunting for them and in placing them in the nut, and many times when so placed they are incorrectly positioned to have the flange in the bearing band at the wrong side of the gasket.

By the present invention the gasket and the band are carried by the nut hence such loss or misplacement of the gasket and band, or either, does not occur.

One of the objections heretofore to the usual compression pipe couplings has been the fact that excessive pressures developed in the pipe, such as water hammer etc., have caused the pipe to separate from the couplings by movement of the pipe lengths out of the bore in the coupling.

One of the objects of this invention is the provision of means for preventing such occurrence while permitting the pipe to be readily slipped into the bore of the coupling.

Other objects and advantages will appear in the description and in the drawings.

In the drawings,

Fig. 1 is a sectional view through a regular coupling that is in position connecting the ends of pipe.

Fig. 2 is an elevational view of an L having nut structure as shown in Fig. 1 on opposite ends or the ends may have the same nut structure as is on either end of the sleeve shown in Fig. 1.

Fig. 3 shows an elevational view of a T having similar nut structures on the ends of the arms thereof in any desired combination.

Fig. 4 is an enlarged sectional view taken through the gasket clamping nut, gasket and locking ring with the pipe to be coupled indicated in dot-dash lines.

Fig. 5 is a fragmentary enlarged sectional view as seen from line 5—5 of Fig. 4.

Fig. 6 is a fragmentary enlarged sectional view similar to that of Fig. 5 showing a modification of the invention shown in Fig. 5.

In detail, the pipe lengths to be coupled by the present structure are indicated generally as 1 and 2 in Fig. 1. These may or may not be threaded at their adjacent ends. In any event, such threads, if present, do not cooperate with the present invention.

In Fig. 1, the coupling is of the regular type for coupling the adjacent ends of the aligned pipes 1, 2, and said coupling comprises a tubular sleeve 3, which is preferably a length of standard Shelby seamless steel tubing that is externally threaded at its opposite ends and bevelled inwardly. This structure provides strength with economy inasmuch as it has heretofore been the practice to cast malleable iron or forge steel sleeves formed with radially inwardly directed flanges at their ends to act as stops for the gaskets, or to upset the ends to provide stops. No such special structure is required by the present invention since the tubing is standard and need merely be cut to the desired length or lengths and externally threaded at their ends and bevelled.

A nut 4 is provided for each threaded end of the sleeve, and as the nut is the same for sleeves, L's, T's etc., it will bear the same number in all of the views.

The nut 4 is formed at one end with a radially inwardly projecting annular flange 5. This flange has substantially the same inside diameter as that of the inside of the sleeve 3 and is preferably no less in diameter than the inside diameter of said sleeve since it is preferable that the pipe lengths 1, 2 have a fairly good fit in sleeve 3 that is not too loose.

The opposite end of the nut 4 is formed with inwardly projecting threads 6 that project inwardly beyond the inside surface 7 that is between flange 5 and the threads. Thus the largest inside diameter of the nut is between said flange 5 and the threads.

In this space between flange 5 and the threads 6 is a continuous annular band 8 that extends substantially the full distance between said flange and threads.

This band 8 is formed at its end adjacent to flange 5 with a radially inwardly projecting flange 9 and said band including said flange function to provide metal bearing surfaces for a gasket 10, the latter being enclosed by the band with the flange 9 on the band between the side of the gasket and the flange 5, and, as seen in Fig. 4 the inside diameter of the band 8 is greater than the diameter of the thread 6 at the root thereof thereby permitting band 8 to pass over the crest of the thread on sleeve 3 should a tight seal of the gasket require tightening of the nut to the point where the band would prevent such seal were movement of the latter obstructed by the thread on the end of sleeve 3.

It is pertinent to note that the band 8 is expanded into the space between threads 6 and flanges 5, so that its diameter is greater than the inside diameter of the threads 6 and flange 5.

The outside diameter of the gasket 10 is also slightly greater than the inside diameter of the threads 6 and flange 5. Therefore, when the band and gasket are in the space between said threads and flange 5, they will not fall out, but are held with the nut, and the band is rotatable in the nut so that a tightening of said nut onto the end of sleeve 3 will not mutilate the gasket. Instead, the flange 5 has a sliding engagement with flange 9 of band 8 and band 8 provides a metal to metal contact and bearing surface for the outside of the gasket. As the nut is tightened, the one side of the gasket will engage the end of the sleeve 3. The primary function of the metal band 8 that is provided in the compression nut 4 is to reduce friction. Without it the gasket 10 will grip the compression nut 4 just as hard as it grips the pipe and excessive torque will be required to make a tight joint. The gasket 10 might or might not be damaged during the operation.

The gasket is preferably of rubber-like plastic material having high resistance to deterioration from chemicals and other sources. Polymerized chloroprene known under the trade name of "neoprene," and of say a Shore Durometer of 80° has been found to be quite satisfactory. A gasket of this character is distortable radially inwardly upon compression axially between the flange 5 and the adjacent end of sleeve 3 so as to form a tight seal between the exterior of the pipe that is being coupled together, and the nut and sleeve. In many installations, this type of nut is wholly satisfactory, and may be used on both ends of the sleeve 3, or on one or both ends of the L 20 (Fig. 2) or on one or more ends of the arms of the T 21, shown in Fig. 3.

There are installations where it is highly desirable, if not essential, that one or all of the pipe lengths coupled together at any coupling, whether a sleeve, L or a T, should not be capable of retraction from the sleeve, L or T, and in such instances, in addition to the band 8 and gasket 10, a relatively thin slice ring 11 is provided, which ring is formed with an annular cylindrical portion 12 that fits against the inner side of the gasket 10 at the end of the latter adjacent to flange 5, and said portion 12 is also formed with an annular radially outwardly extending projection or flange 13 that is in lapping relation to flange 9 on the band.

This ring is transversely split and is formed along the free edge of the portion 12 with a relatively sharp edge 14. Edge 14 is slightly offset radially inwardly relative to the main body of portion 12 with said edge directed both axially and radially inwardly in direction away from the flange 13.

As seen in Fig. 5, said edge 14 may be circular or they may be sharp edged segments 15 (Fig. 6). In any event, the inside diameter of such sharpened edges may be slightly less than the outside diameter of pipe 1 or 2, and as the edge is directed away from the flanges 13 and 5, it will be seen that a pipe length 1 or 2 may be readily slipped into the bore of the sleeve 3 or the bore in any or all of the legs or arms of the L 20 or T 21. When the pipe is so moved into these pieces, and through the nuts 4 therein, the pipe will expand the ring and the sharp edges of said rings 11 lock the pipe against withdrawal. Thus excessive internal pressure caused by any reason, will not result in separating the pipe from the body of such coupling.

A tightening of the nut 4 in each instance in which there is a locking ring will also force the sharp edges of the ring into locking engagement with the pipe to further resist withdrawal of the pipe.

Referring to gasket 10, an important feature of this gasket from the standpoint of the "pull out" value of the coupling, is the fact that sleeve 3 and gasket 10 have their adjoining ends complementarily bevelled at substantially an angle of 30° relative to horizontal with the bevel at the ends of the sleeve being on the inner face of the latter, while the bevel is on the outer face of the gasket.

In tightening the nut, the ring 8 takes great pressure from the gasket. When the nut is loosened, the ring 8 which may have expanded slightly under such pressure, will spring back and will be free to rotate as before, although the nut itself will back up the ring to take pressure when the nut is tightened.

Where the coupling is used over rubber insulating tube on copper pipe, the gripping ring 12 of Fig. 4 obviously cannot be used because it would cut through the rubber insulating tube and would destroy it, although where uncovered metal pipe is to be coupled, the ring 12 provides an adequate "pull out" value.

In actual practice, the pull out value of the present coupling on a ⅞ inch O. D. copper tubing covered with a rubber composition insulating sleeve is substantially 800 lbs. per square inch where no ring 12 is used, but with the remaining structure as shown and described. Upon dismantling the coupling and tube it was found that the said insulating sleeve was not damaged nor were any of the elements of the coupling, and the gasket was in perfect condition for re-use without change.

I claim:

A coupling nut for use on the externally threaded end of the sleeve of a pipe coupling, said nut having a central through bore, a flange integral with said nut projecting radially inwardly of said bore at one end of the latter, said bore having a portion at the end thereof opposite to said flange projecting radially inwardly and a thread on the radially inwardly facing side of said portion wholly disposed radially inwardly toward the axis of said bore a distance closer to said axis than the surface of the bore that is between said portion and said flange, an annular gasket of elastic material that is radially distortable under axial compression disposed within said bore between said portion and said flange, a continuous cylindrical metal band surrounding said gasket and extending substantially the full distance between said portion and said flange, said band being formed with a radially inwardly projecting flange at one end thereof extending over and in engagement with the axially facing surface of said gasket that is adjacent to the flange on said nut for engagement with said last mentioned flange when said nut is tightened on the threaded end of such sleeve, said band terminating in a free end edge at the end thereof that is opposite to the flange thereon, said band being rotatable within said bore and having a uniform inside diameter that is greater than the diameter of the thread on said portion at the root of said thread whereby said band is adaped to pass over the crest of the thread that is on the said threaded end of such sleeve when said nut is tightened on said last mentioned threaded end a sufficient distance to move said band over the thread on said threaded end of such sleeve.

References Cited in the file of this patent

UNITED STATES PATENTS

| | | |
|---|---|---|
| 1,824,642 | Uber | Sept. 22, 1931 |
| 2,405,822 | Frank | Aug. 13, 1946 |
| 2,460,032 | Risley | Jan. 25, 1949 |
| 2,474,319 | Muller | June 28, 1949 |
| 2,491,884 | West | Dec. 20, 1949 |
| 2,529,552 | Herold | Nov. 14, 1950 |
| 2,613,086 | Wolfram | Oct. 7, 1952 |